F. MULLER.
SINE BAR.
APPLICATION FILED SEPT. 2, 1915.
1,179,551.
Patented Apr. 18, 1916.
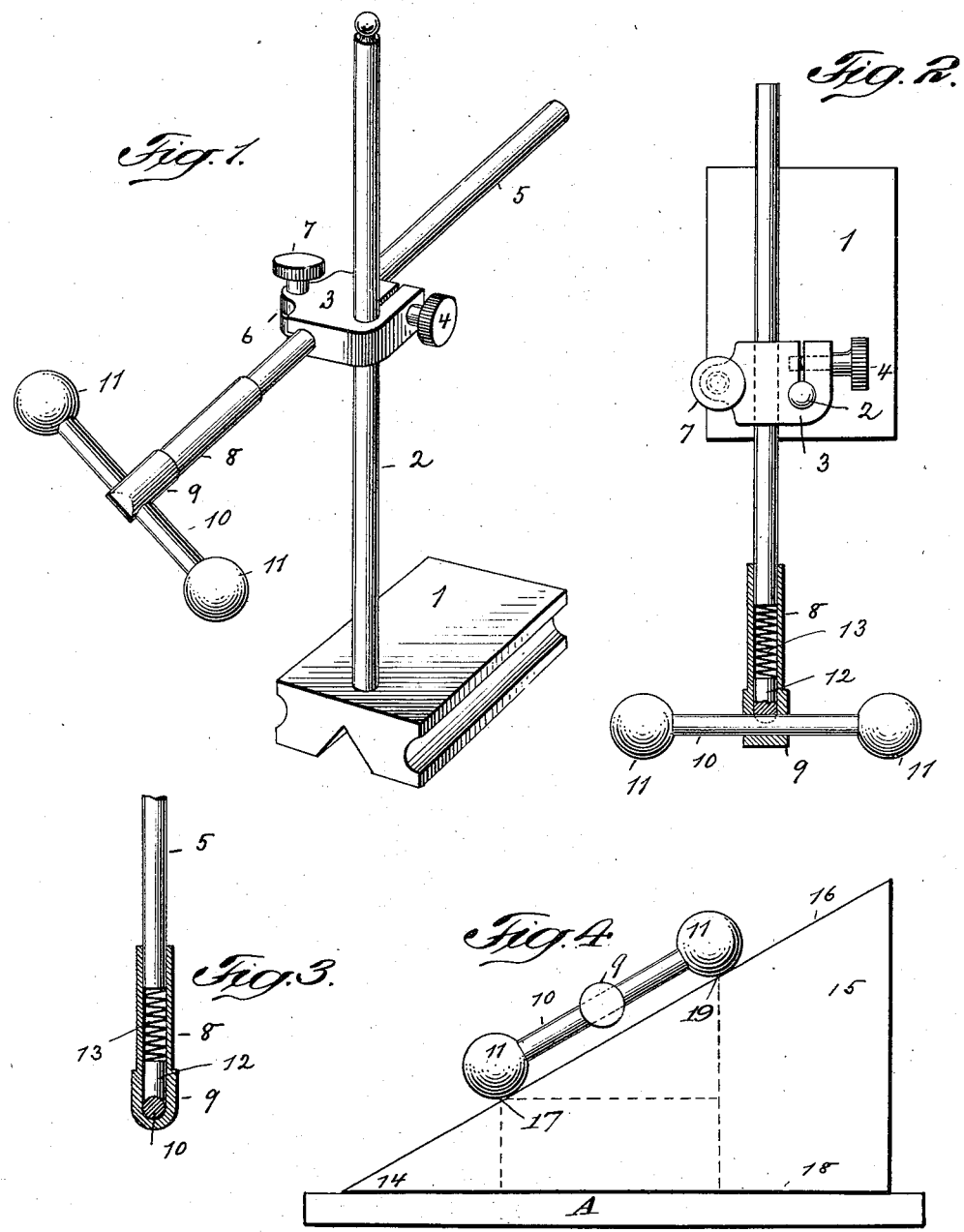

UNITED STATES PATENT OFFICE.

FREDERICK MULLER, OF ELIZABETH, NEW JERSEY.

SINE-BAR.

1,179,551.   Specification of Letters Patent.   Patented Apr. 18, 1916.

Application filed September 2, 1915.   Serial No. 48,640.

*To all whom it may concern:*

Be it known that I, FREDERICK MULLER, a citizen of the United States, and a resident of Elizabeth, in the county of Union and State of New Jersey, have invented a certain new and useful Improvement in Sine-Bars, of which the following is a specification.

This invention relates to a sine bar or tool maker's device of novel construction for accurately ascertaining the sine of any angle from one minute to ninety degrees, so that in this way, the angle itself may be found by consulting a sine table. The tool is adapted for finding or testing the angles, externally as well as internally of jigs, fixtures and other tool work generally which require extreme accuracy.

In the accompanying drawing: Figure 1 is a perspective view of a sine bar embodying my invention; Fig. 2, a plan, partly in section; Fig. 3 a section through the tubular member taken at right angles to Fig. 2, and Fig. 4 a diagram showing the position of the bar when the device is in use.

From a suitable base 1, projects upwardly, an upright post 2, the whole constituting a support. The post is encompassed by a clamp 3 which is vertically adjustable thereon, and is held in position by a set screw 4. Clamp 3 in turn carries a rod 5, which is by the clamp sustained, or adapted to be sustained, in a horizontal position. Rod 5 is so mounted that it is free to be projected backward or forward in a longitudinal direction, and to be likewise turned on its own axis, for which purpose the clamp may be provided with a split bearing 6 that accommodates the rod, and is adapted to be tightened up by a screw 7.

On its front end, rod 5 is provided with a forwardly projecting tubular extension or socketed member 8, having a head 9, which is apertured at right angles to the axis of rod 5. Through this aperture there passes slidably, a bar 10, carrying a rounded head or section 11, at each of its ends, the length of the bar from the center of one head to the center of the other head representing a fixed unit of say two inches. In order to sustain the bar in any position to which it has been set, it is frictionally engaged by a small concaved plunger 12, which is projected against the bar by a coiled spring 13, the plunger as well as the spring being accommodated within the bore of socket 8.

In order to measure say the angle 14 of a work piece 15 placed on a bench or other base A, set clamp 3 to the proper elevation on post 2, and so move and turn rod 5 in the clamp that the heads 11 of bar 10 will rest upon the inclined surface 16, after which tighten up screws 4 and 7. Remove the work piece from the bench and measure by a height gage the two distances from the lowest points 17, 19 of balls 11 to base line 18. Subtract these distances from each other to obtain the sine of angle 14. Divide this sine by the fixed unit of bar 10, the resultant figure being given in decimals. By now looking up this figure in a sine table, the angle 14 will be found in degrees and minutes.

In case the formation or location of the work piece is such that the lower head 11 may rest on the base line 18, the first measurement above referred to is of course eliminated. In case an internal measurement is to be effected, bar 10 is raised, pushed down to enter the hollow of the work piece, and placed against the interior surface to be gaged. By next removing the work piece while the bar remains fixed, the desired measurements may be readily ascertained. It will be observed that all tangent points of one of the heads 11, will be spaced equally from the corresponding tangent points of the other head, so that the constant will remain the same at all inclinations of bar 10.

My tool is of simple construction, may be readily manipulated, and will give the angles to be found, with the greatest accuracy. The tiltable bar 10 with the balls 11 may of course also be applied to stands or surface gages of other constructions.

I claim:

1. A sine bar comprising a support, an axially rotatable rod carried thereby, a bar extending at right angles to the rod, rounded ends at the bar, and means for adjustably holding the bar to the rod.

2. A sine bar comprising a support, an axially rotatable and longitudinally slidable rod carried thereby, a bar carried by the rod and extending at right angles thereto, and rounded heads at the ends of the bar.

3. A sine bar comprising a support, an axially rotatable rod carried thereby, said rod having a transversely apertured member, a bar slidably engaging the transverse aperture of said member, and rounded heads at the ends of the bar.

4. A sine bar comprising a support, an axially rotatable and longitudinally slidable rod carried thereby, said rod having a transversely apertured member, a bar slidably engaging the transverse aperture of said member, rounded heads at the ends of the bar, and bar sustaining means, carried by the member.

5. A sine bar comprising a base, a post extending upwardly therefrom, a clamp adjustable along the post, an axially rotatable rod carried by the clamp, a bar extending at right angles to the rod, and rounded heads at the ends of the bar.

6. A sine bar comprising a base, a post extending upwardly therefrom, a clamp adjustable along the post, a longitudinally slidable and axially rotatable rod carried by the clamp, a transversely apertured member carried by the rod, a bar slidably engaging the transverse aperture of said member, rounded heads at the ends of the bar, and bar-sustaining means carried by said member.

7. A sine bar comprising a base, a post extending upwardly therefrom, a clamp adjustable along the post, a longitudinally slidable and axially rotatable rod carried by the clamp, a tubular, transversely apertured member carried by the rod, a bar slidably engaging the transverse aperture of said member, and a spring-controlled plunger housed within said member and engaging the bar.

8. A sine bar comprising a base, a post extending upwardly therefrom, a clamp adjustable along the post, a longitudinally slidable and axially rotatable rod carried by the clamp, a tubular, transversely apertured member carried by the rod, a bar slidably engaging the transverse aperture of said member, rounded heads at the end of the bar, and a spring-controlled plunger housed within said member and engaging the bar.

FREDERICK MULLER.